US006967945B2

(12) United States Patent
Hethuin et al.

(10) Patent No.: US 6,967,945 B2
(45) Date of Patent: Nov. 22, 2005

(54) METHOD AND SYSTEM OF COMMUNICATIONS USING A PULSE TRANSMISSION PROTOCOL

(75) Inventors: Serge Hethuin, Courbevoie (FR); Fabrice Legrand, Paris (FR); Christophe Le Martret, Levallois Perret (FR)

(73) Assignee: Thales, Neuilly S/Seine (FR)

( * ) Notice: Subject to any disclaimer, the term of this patent is extended or adjusted under 35 U.S.C. 154(b) by 0 days.

(21) Appl. No.: 10/801,040

(22) Filed: Mar. 16, 2004

(65) Prior Publication Data

US 2004/0184486 A1 Sep. 23, 2004

(30) Foreign Application Priority Data

Mar. 18, 2003 (FR) .............................. 03 03304

(51) Int. Cl.⁷ .................................................. H04J 3/06
(52) U.S. Cl. ...................... 370/350; 370/503; 375/354; 455/404; 455/456; 455/502
(58) Field of Search ................................ 370/350, 503; 375/354; 455/404, 456, 502, 503, 507, 404.1, 456.1, 456.2, 456.3, 50.2

(56) References Cited

U.S. PATENT DOCUMENTS

| 6,366,569 | B1 | * | 4/2002 | Ritter ......................... 370/337 |
| 2003/0063597 | A1 | * | 4/2003 | Suzuki ....................... 370/347 |
| 2004/0008617 | A1 | * | 1/2004 | Dabak et al. ............... 370/208 |

FOREIGN PATENT DOCUMENTS

| WO | 02 052740 A | 7/2002 |
| WO | 03 009608 A | 1/2003 |

* cited by examiner

*Primary Examiner*—Ricky Ngo
*Assistant Examiner*—Richard Chang
(74) *Attorney, Agent, or Firm*—Lowe Hauptman & Berner, LLP (57) ABSTRACT

Disclosed is a method and system of communications in a network using a protocol of transmission of pulses between a master station and one or more user stations. The pulse response of the master station received by the user stations is synchronized. The pulse responses acquired from the user stations are received by the master station. Pulses close to each other are sent from the master station to the different user stations, and from the differnt users to the master station. The pulses are equalized at reception for each user station and for the master station.

15 Claims, 8 Drawing Sheets

| P1 | BCH | P2 | FCH | ACH | P3 | DOWNLINK CHANNEL PACKETS | P4 | UPLINK CHANNEL PACKETS | P5 | RCH |

FIG.1

| P1 | BCH | FCH | ACH | DOWNLINK CHANNEL | CHAC | Tg | UPLINK CHANNELS | RCH |

METHOD AND SYSTEM OF COMMUNICATIONS USING A PULSE TRANSMISSION PROTOCOL

BACKGROUND OF THE INVENTION

1. Field of the Invention

The invention relates notably to a method and system of communications, for example in a communications network that uses a UWB type protocol and in which the transmission is carried out by pulses.

It can be applied for example to communications between mobile terminals and a central station responsible for making massive deliveries of information to these mobile terminals. The station is generally called "Hotspot" in telecommunications literature. The invention relates chiefly to "large-scale consumer" applications such as data servers in airports, railway stations and shopping centers. At the same time, it can also be deployed temporarily for action teams (such as teams of firefighters, doctors, special forces, maintenance teams in high-risk areas etc).

It can be applied in communications networks using a TDMA (Time Division Multiple Access) type of protocol. It is also used in applications that rely on a frame partially formed by a zone reserved for recurrent streams, equivalent to a TDMA frame.

2. Description of the Prior Art

For example, a WiFi type of "Hotspot" station based on the 802.11b standard enables the delivery, on a channel, of a radio bit rate of 11 Mb/s shared among all the users in applications that are essentially data transfer applications. The following are the characteristics of this station:

a typical range of about some hundreds of meters in unencumbered space;

a 2.45 GHz frequency band;

a CSMA (Carrier Sense Multiple Access) access protocol.

Access Protocols

The two protocols most commonly used in small-sized or medium-sized radio networks are the CSMA/CA (Carrier Sense Multiple Access/Collision Avoidance) and the TDMA (Time Division Multiple Access) protocols. Each has advantages and drawbacks that make it suited to different users, mainly in terms of service quality and network topology.

The CSMA/CA protocol is based on random and hence non-deterministic access which means that it is inefficient for services requiring constant service quality in terms of regularity and time schedules. This protocol notably has the advantages of offering equality of access to the carrier and simplicity of implementation. However, its performance is mediocre in terms of bit rate, firstly because of the periods of time lost between the transmission of frames and, secondly, because of collisions. Furthermore, it is not possible to ensure adequate service quality for voice and video owing to the variable nature of transmission times and the fact that there are no boundaries on these transmission times.

In the case of the centralized type of TDMA protocol, the time is evenly subdivided into frames of fixed length, themselves subdivided into different zones with various purposes. A station plays the role of network coordinator in assigning the resources of each frame to the different users depending on their needs. This station is called a central station or, again, a master station. A station wishing to send must therefore always make a preliminary request to this master station, which assigns it a time resource proportional to its needs, provided that there is sufficient availability.

There are therefore no collisions to be managed in a TDMA protocol, except in the access channel to the network for which it is not possible to have any other solution but which takes up only a small part of the frame. Furthermore, with this system, it is possible to transmit regular streams such as voice or video streams which require a constant bit rate and low latency time. However, the traffic generated by the signaling may be great.

Existing UWB Systems

The physical layer of the transmission system proposed according to the invention is based notably on ultra wideband technology. The principle of UWB lies in transmitting information in very short pulses (of the order of 1 ns) in baseband. This results in two characteristic properties of UWB, namely:

1) spectral power density (Power Spectral Density) with a very wide band (>1 GHz) and thus a very low maximum PSD level comparable to noise. The system thus has high immunity against scramblers and interference sources, whether intentional or not, owing to its bandwidth and does not disturb other transmission systems present in the passband of the proposed system. This therefore intrinsically leads to low probability of interception and low probability of detection (LPI/LPD).

2) the absence of the carrier frequency which simplifies radio processing operations at reception relative to conventional receivers.

UWB (or again radio pulse) transmission systems have essentially been described at the physical layer level, in the reference [1] M. Z. Win and R. A. Scholtz, << Impulse radio: how it works>>, IEEE Com. Letters, vol. 2, no. 2, February 1998, pp. 36–38, This physical layer uses a technique of time hopping code division multiple access or TH-CDMA. The idea is to transmit the pulses by spacing them out in time pseudo-randomly, each user having his own sequence. In principle, this enables the use of the UWB in an asynchronous multi-user context that is particularly adapted to ad-hoc networks. The use of this physical layer with practical systems is described in two articles:

M. Z. Win, X. Qiu, R. A. Scholtz, and V. O. K. Li, "ATM-based TH-SSMA network for multimedia PCS", IEEE JSAC, vol. 17, No. 5, May 1999, pp. 824–836, and S. S. Kolenchery, J. K. Townsend, and J. A. Freebersyser, <<A novel impulse radio network for tactical military wireless communications>>, IEEE Milcom Conf., Bedford, Mass., USA, October 1998, pp. 59–65.

These documents describe the TH-CDMA technique of access without going into detail on the MAC layer and the structure of the corresponding frames. Furthermore, since the lag between two successive pulses is set so as to prevent multiple paths (it is typically set at 100 ns in indoor conditions) and since a symbol has to be transmitted on several pulses (with integration enabling an increase in the signal-to-noise ratio), the maximum bit rates that can be reached are of the order of a few Mb/s only.

At present, the efficiency of a TDMA protocol applied to UWB is lower than that obtained with narrowband transmission methods. The cause of this low efficiency is, firstly; the lengthy period of time needed for synchronization in UWB, which may go up to several milliseconds (depending on the length of the acquisition codes and the reception structure) and secondly the fact that the specific nature of the pulse waveform is not taken into account. Indeed, the low cyclical ratio of the pulses used in UWB (about 1%) means that it is possible to make use of large zones of "silence". Now, if a classic TDMA is used to separate two users, i.e. by making them transmit one after the other, the unused time between the pulses sent by a same user is lost. This time interval enables the passage of a pulse response following the sending of a pulse by any station whatsoever.

In the method according to the invention, for example, the pulses sent by a same user station or by several different stations are made to approach one another to the maximum extent in the direction of communication (from the central station to the users and vice versa). To this end, the invention applies a technique of precise synchronization (it is aimed to achieve 1 ns for example) known as the fine synchronization of the user stations followed by a technique of equalization of the transmission channel on the pulses at reception, in order to combat interference between successive pulses. Furthermore, in the case of centralized communications networks, the method may entail the performance of a complementary interlacing of the pulse trains either from the different users addressed to the central station or from the central station to the users.

The idea in particular is to offer a TDMA protocol optimized for the UWB physical layer, enabling high bit rates to be achieved while at the same time preserving constant quality of service.

SUMMARY OF THE INVENTION

Hereinafter in the description, the expressions "central station" and "master station" designate a similar element depending on the type of application. The invention relates to a method of communications in a network using a protocol of pulse transmissions between the station and one or more user stations, wherein the method comprises the least the following steps:

synchronizing the pulse response of the master station received by the user stations;

acquiring the pulse responses from the user stations received by the master station;

sending pulses close to each other from the master station to the different user stations, and from the different users to the master station;

equalizing the pulses at reception for each user station and for the master station.

The method comprises for example a step for the interlacing of signals sent from the user stations to the master station and/or a step for the interlacing of the signals sent from the master station to the user stations.

The invention also relates to a system of communications in a network using a protocol of transmission by pulses between the master station and one or more user stations, wherein the master station and the user stations are equipped with processors adapted to:

synchronizing the pulse response from the master station received by the user stations;

acquiring the pulse responses from the user stations received by the master station;

sending pulses close to each other from the master station to the different user stations, and from the different users to the master station;

equalizing the pulses at reception for each user station and for the master station.

The invention is used for example in the centralized network or in a network using a UWB transmission layer.

The invention has notably the following advantages:

it enables very high transmission capacity of several tens of Mb/s, while at the same time providing for maximum discretion and protection against interference or scramblers if any;

it provides the central station of the device with knowledge of distances of the terminals (user stations) connected to it and, if necessary, directions of arrival of the signals coming from these terminals.

BRIEF DESCRIPTION OF THE DRAWINGS

Other features and advantages of the present invention shall appear more clearly from the following description, given by way of an illustration that in no way restricts the scope of the invention and from the appended figures, of which.

MORE DETAILED DESCRIPTION

In order to provide for a clearer understanding of the invention, the following example, which is given by way of an illustration that is in no way exhaustive, relates to a centralized communications network that accepts a UWB protocol and in which the transmissions are made by pulses. For a centralized network, the term "central station" is used to designate the "master station".

Briefly, the idea of the invention consists notably in using the space left vacant between the pulses sent out by a user station or by several users stations, getting rid of mutual interference caused by closeness between the pulses (owing to the use of the vacant space), and ensuring that there is no overlapping of the pulses from the different users. This is achieved by the following means:

first of all a procedure of time synchronization, the coupling of this time synchronization procedure with a procedure for determining the pulse response of the transmission channel, an equalization phase designed notably to correct:

the interlinked responses of the train of pulses that are very close to each other, sent either by a user station or by the central station (master station), the interlinked responses of the interlaced pulse trains sent either by different user stations toward the central station or by the central station toward the user stations.

This equalization phase may be carried out, for example, by using the inverse of the pulse responses of the different transmitters.

Figure 1:
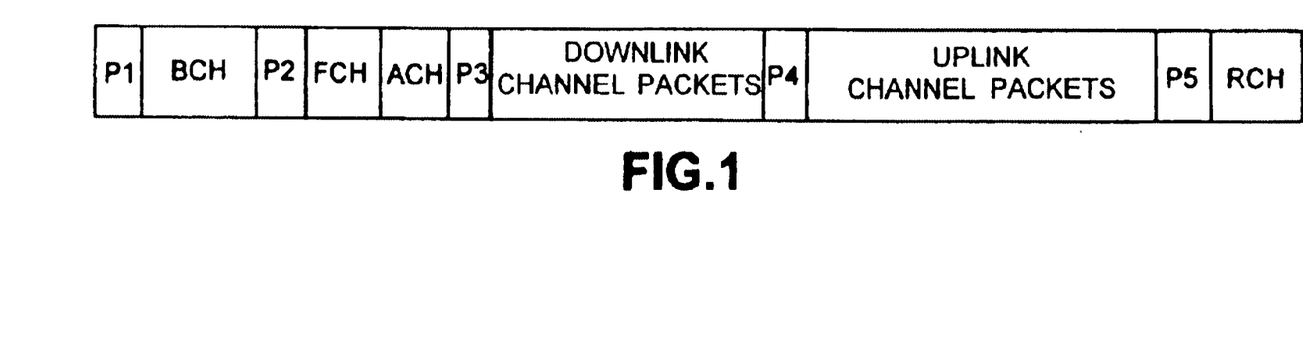
FIG. 1 shows a classic organization of a frame in a radio network with TDMA type access.

As a reminder, FIG. 1 gives a schematic view of a prior art frame in a radio network with TDMA type access.

This frame has several headers which are guard intervals, without transmission, enabling the different nodes of the network firstly to prepare their hardware configuration and secondly to get synchronized for the next phase of the frame. Thus, there are:

P1, before the broadcasting transmission from the central station'

P2, before the allocation of resources;

P3, before the downlinks from the central station to the user stations (terminals) each in its turn;

P4, before passing into uplink mode; and

P5, before starting the reservation phase.

The signaling of this frame comprises the following parts:

BCH (Broadcast CHannel); data broadcasting part used to deliver information common to all the user stations located within radio range of the central station, FCH (Frame CHannel); part sent by the master station, used to indicate the transmission zones in the current frame that are allocated to the different users to receive or transmit data, ACH (Access feedback CHannel); part used by the master station to inform certain users wishing to transmit information that their request (sent in the RCH phase of the previous frame) has been truly taken into account and will be effective within a very short period, RCH (Random access CHannel); part accessible to users wishing to send or receive information, enabling them to make their request known to the central station.

The sending of data in the uplink direction and in the downlink direction will be done as follows:

Downlink channel (messages from the central station to the user stations (terminals)): data packets of defined length sent individually by the central station to the different users, in turn, Uplink channel (messages from the user stations (terminals) to the central station): data packets of defined length sent by the users allowed to send at places allocated in the frame by the master station.

The communications method and device according to the invention rely, for example, on the following elements: the use of a time division access technique (of the TDMA type for example) combined with a time division duplexing (TDD) mode, including:

a specific phase pertaining to the acquisition of the transmission channel for equalization, a technique for equalization of the pulses at reception enabling the pulses to be at higher speed or the interlacing of trains from different users; this notably increases the bit rate for a constant number of users or increases the number of users for a constant bit rate, a procedure for measuring the distance between the access point and the mobile.

Figure 2A:
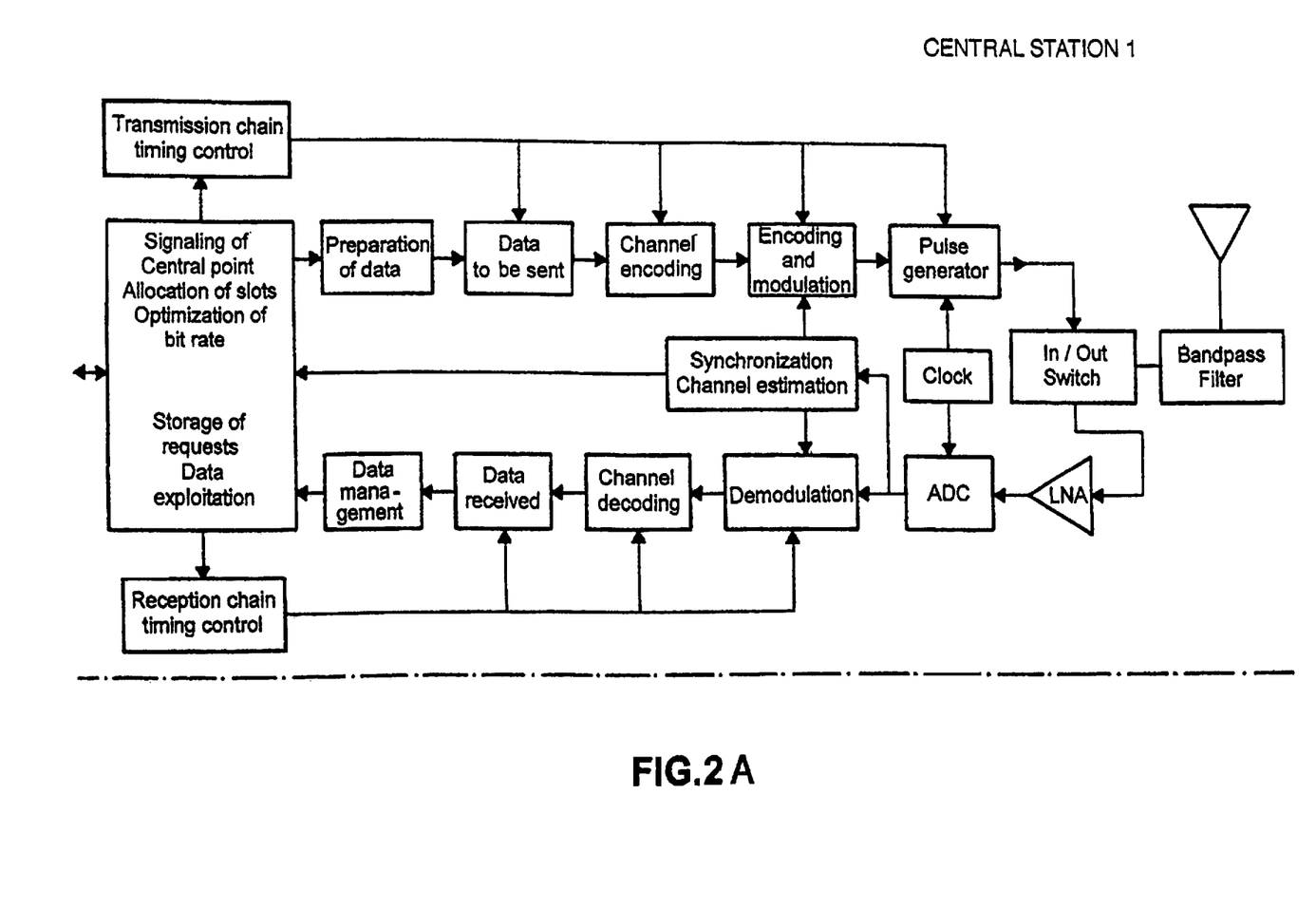
FIG. 2A exemplifies a system architecture according to the invention.
Figure 2B:
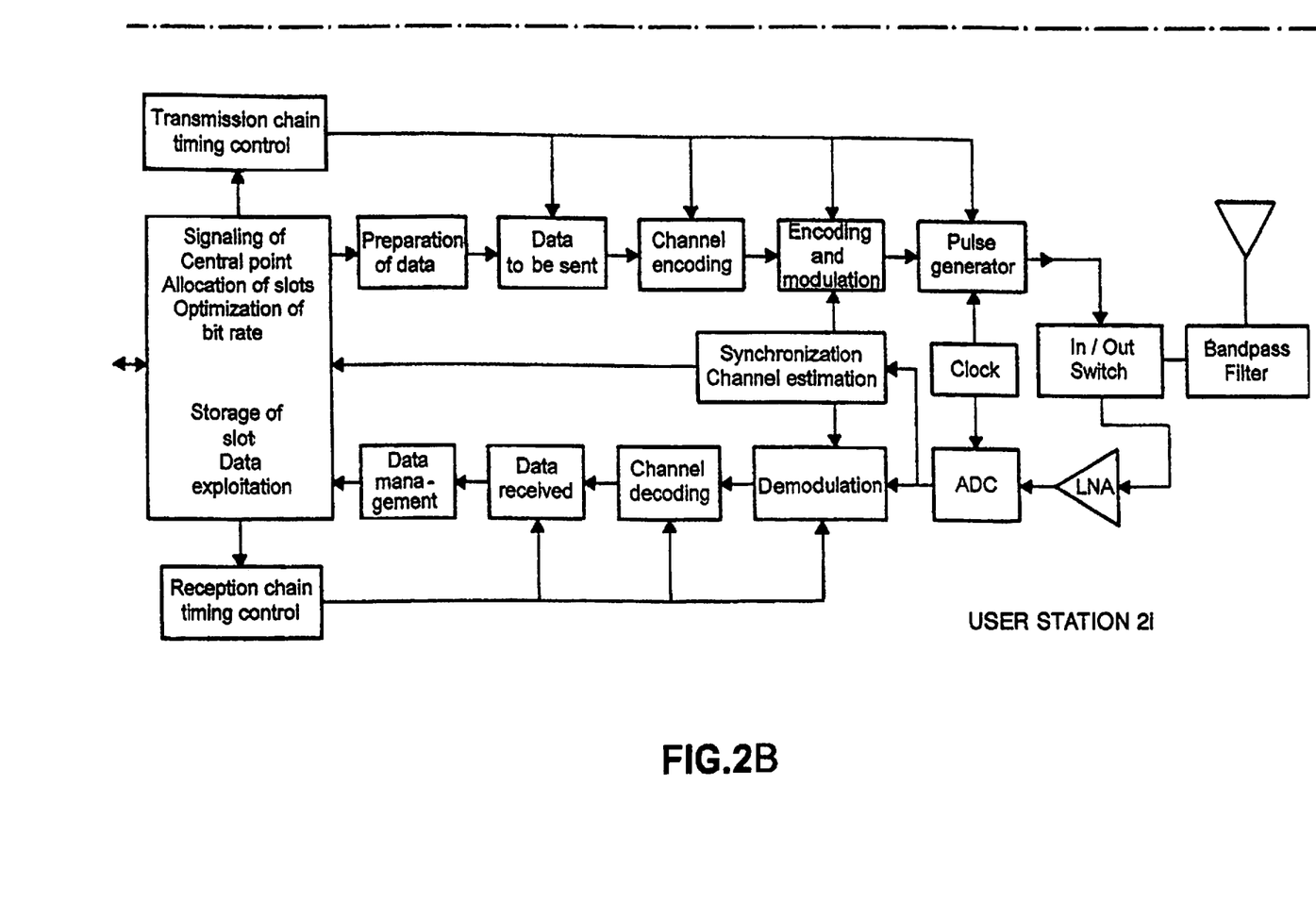
FIG. 2B exemplifies a user station according to the invention.

A centralized communications network according to the invention with UWB type access, more generally with transmission by pulses, is shown schematically in FIG. 2A. It comprises, for example, a central station 1 or master station and different user stations 2i as shown in FIG. 2B (only one station is shown for reasons of simplicity). The transmissions are made in an uplink or downlink channel. The central station and the user stations are provided with processors adapted to implementing a technique of equalization.

The central station is equipped with a processor adapted to giving the distribution of the users of the network (for example their position, etc.), assigning the times resources of the TDMA, the time lag to be applied in the uplink direction (which corresponds to the synchronization between the different users) and, as the case may be, the integration factor (number of pulses per bit) to be used for each station.

Figure 3:
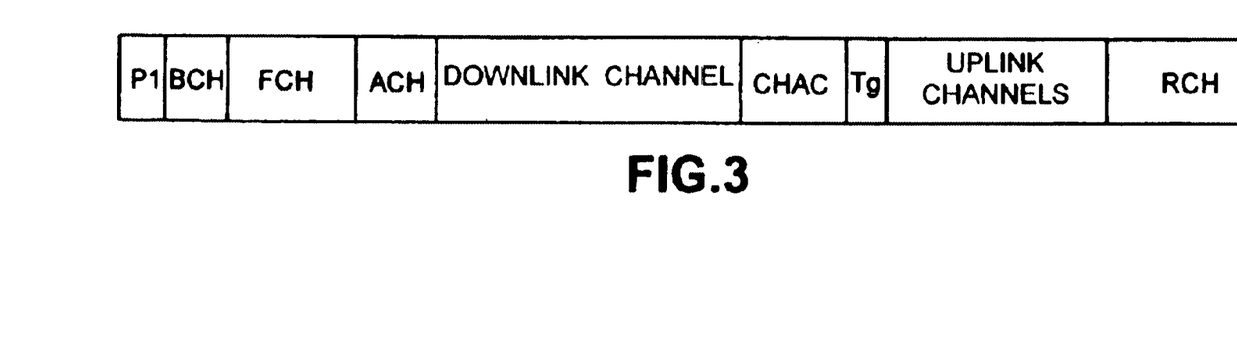
FIG. 3 exemplifies a frame for a time-division mode according to the invention.

The exchanges between the central station and a user station of the network use frames, an exemplary structure of which is given in FIG. 3. As compared with the frame described in FIG. 1, the frame adapted according to the invention comprises, for example, a CHAC (CHannel ACquisition) phase which notably has the function of determining:

the pulse response received by the central station following transmission from a given user station, the transit time of the signals between the given user station and the central station (hence the distance between the central station and concerned user station), the pulse response received by each user station from the central station.

In the example developed here below, it is considered for the sake of simplicity that the method uses a binary modulation, i.e. that one symbol (sequence of pulses) conveys one information bit. This binary modulation may classically be a pulse position modulation (PPM) or polarity (bipolar) modulation.

However, in general, higher-order modulations (2,3,4 . . . bits per symbol) are possible, enabling the bit rate to be further increased. These modulations include pulse amplitude modulation (PAM) or pulse position modulation (m-PPM where m=4 or more) as well as combinations of these forms of modulation.

The structure of this frame, which has a duration of 2180 ms, is for example the following:

Phases of Sending from the Central Station (Master Station) to the User Stations P1: duration 20 µs—long header for the synchronization and "calibration" of the pulse response from the central station received by the user stations followed by a short guard time.

A pulse is sent every 250 ns, with a total of 64 pulses (16 µs), then there is a guard time of 4 µs for the updating of the equalizers in the user stations.

BCH: Duration 16 µs

Sending at the rate of one pulse every 10 ns (possible since the user stations, in the preceding phase P1, have acquired the pulse response from the central station and may henceforth equalize).

A total of 1600 impulsions:

Giving 200 bytes in the case of one pulse/symbol (100 instantaneous Mb/s during 16 µs) reserved for the short ranges (a few meters)

Or again 25 bytes in the case of 8 pulses/symbol (12.5 instantaneous Mb/s during 16 µs), for the bigger ranges.

FCH: Duration 32 µs

Sending at the rate of one pulse every 10 ns,

A total of 3200 pulses

Giving 400 bytes in the case of pulse/symbol

Or again 50 bytes in the case of 8 pulses/symbol .

ACH: Duration 16 µs

A total of 1600 pulses sent at the rate of 10 ns, that is 200 bytes in the case of one pulse/symbol or again 25 bytes in the case of 8 pulses/symbol .

Hence a total sending phase duration of 84 µs.

Downlink Channel Phase

Total duration of the phase: 1024 μs

Figure 4:
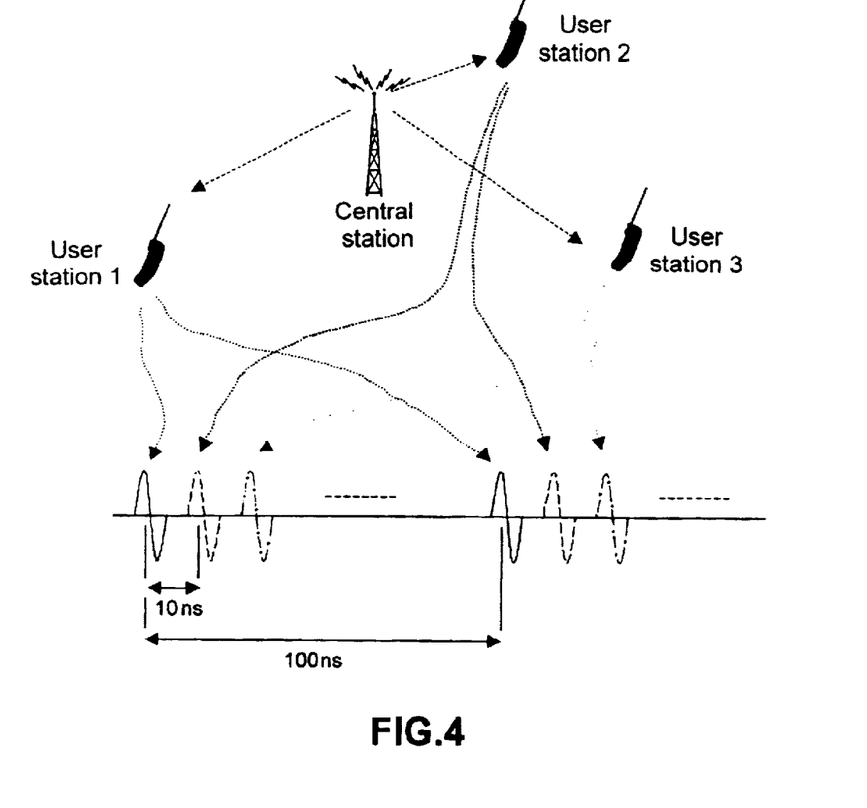
FIG. 4 exemplifies a temporal arrangement of the pulses in a downlink channel according to the device of the invention.

The pulses are sent by the central station (master station) with a minimum spacing of 10 ns (100 Mb/s instantaneous in the case of one symbol per pulse) and, as the case may be, these pulses are interlaced for example in such a way that the user receives a pulse concerning him every 100 ns as can be seen in FIG. 4.

For example, with parameters of spacing equal to 10 ns and of recurrence equal to 100 ns, it is possible to interlace a maximum of 10 users. However the total number of user stations may be greater because the phase is subdivided into 32 slots of 32 μs. The central station assigns N (between 1 and 32) 'slots' to each user station and a lag time relative to the start of the downlink phase:

$$Ti=ni*32 \mu s+ki*10 \text{ ns}$$

with $0 \leq ni \leq 31$: number of the authorized block
and $0 \leq ki \leq 9$: temporal matching of the read operation to a terminal relative to the start of the block.

Given that this protocol enables the central station to have knowledge of the distances of the different user stations (through the CHAC procedure described here below), the central station can also adapt the number of pulses per symbol (as indicated for the FCH phase). For a near station, the integration factor will be smaller than for a distant station. The integration factor corresponds to the length of the code and hence to the number of pulses for transmitting an elementary symbol, e.g. 1024 pulses instead of 16 pulses reducing the bit rate by 1024/16=64.

Figure 5:
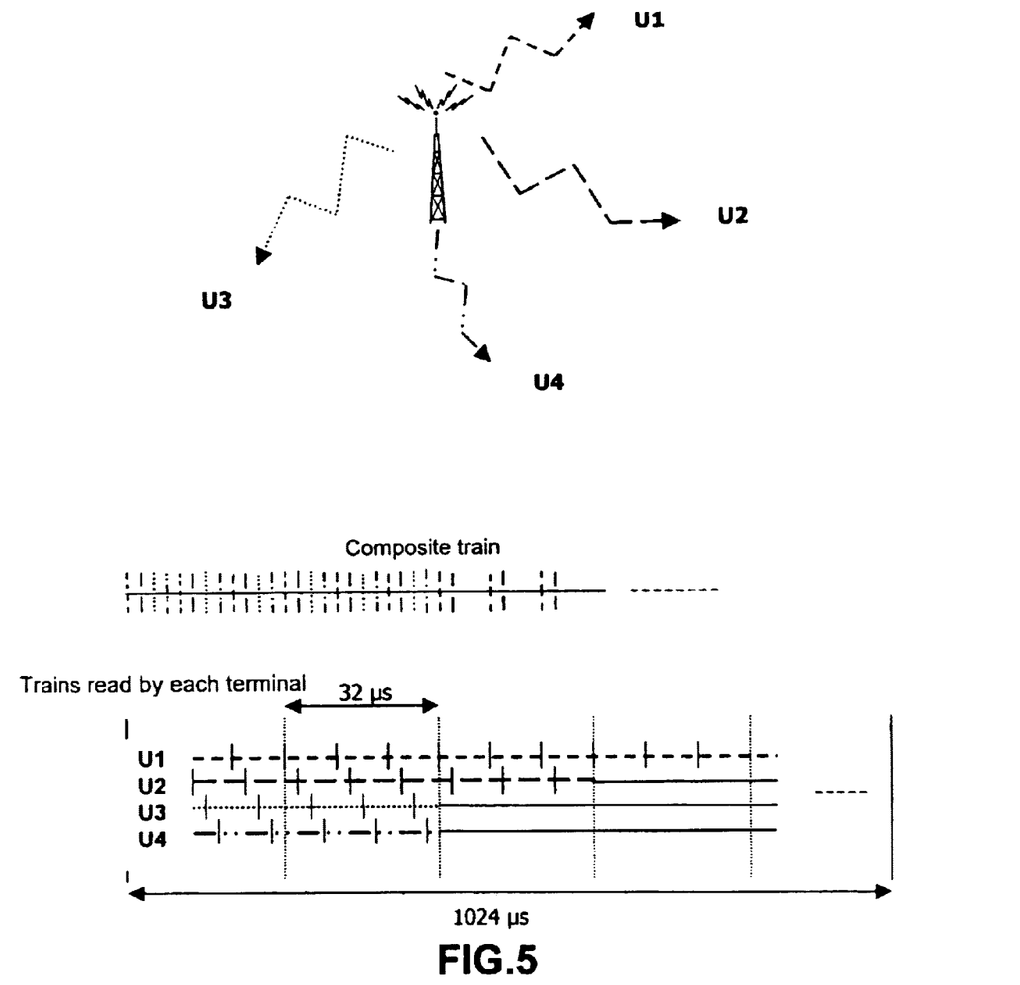
FIG. 5 exemplifies a composite pulse train in a downlink channel according to the device of the invention.

The example given in FIG. 5 represents a simultaneous interlacing of four users U1, U2, U3 and U4 and three pulses per slot only. In this Figure, the users are differentiated by lines that are broken in varying degrees. The interlaced pulses are separated on different axes for a clearer understanding of the invention. Furthermore, for easier viewing, the multiple paths are not shown.

Another possibility consists in multiplexing the different users by orthogonal codes known as THC (Time Hopping Codes) while at the same time separating two successive pulses by at least 10 ns.

Figure 6:
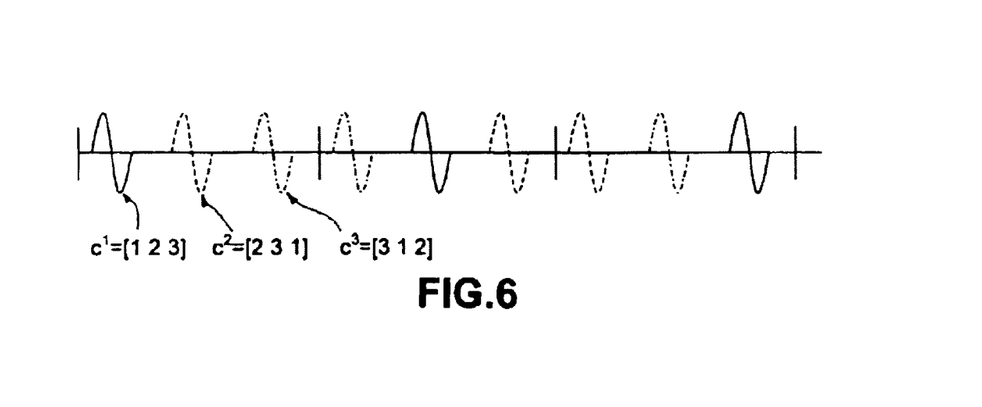
FIG. 6 exemplifies a linear code that can be used in the downlink direction.

FIG. 6 exemplifies a linear time hopping code with a length 3 with three users in the downlink direction. It is possible to use a catastrophic code (i.e. a code without good correlation properties) because there is no problem of synchronization. These pulses are sent by a single user (to the central station or the master station).

It is also possible to superimpose a pseudo-random time hopping code THC with good properties of correlation to be able to separate several channels on a same base station, or again a PN (Pseudo Noise) code if a modulation other than PPM (Pulse Position Modulation) is used as the bipolar modulation, which amounts to applying CDMA (Code Division Multiple Access) between the channels of the central station. Furthermore the use of a THC also makes it possible to smoothen the spectrum or eliminate the spectrum lines spaced out by 100 MHz for pulses spaced out by 10 ns, and more generally to eliminate the lines spaced out by 1/T if T is the temporal spacing between the pulses.

Another procedure consists of the use of a simple TDMA mode with pulses that are very close to each other, as in the broadcast phase. This requires the receivers of the user stations to work at their full rate, but the management is simpler. It is also possible to superimpose a pseudo-random code to smoothen the spectrum or separate the channels of the central station (if there are several of them).

One alternative embodiment related more particularly to operation in the downlink channel consists of the inclusion of a reference channel type of device having notably the function of maintaining the synchronization of the mobile or inactive user stations. For example, on the 10 simultaneously interlaced pulse trains, it is possible to reserve the first train for this purpose and not transmit information on this channel. Thus, when a user station does not receive data concerning it from the central station, it gets locked into this reference pulse train and thus keeps synchronization with the central station.

This variant has notably the following advantages:

1. The user stations that do not receive any data concerning them from the start of the downlink channel remain synchronized with the central station and are ready to receive their data at any time whatsoever of this phase. Similarly, those that have received data at the beginning of the phase remain synchronized throughout the phase until the beginning of the next phase, thus preventing their oscillator from drifting excessively over time.

2. The reference pulse train is also useful in tracking the response of the propagation channel between the access point and the mobile units if an adaptive equalization is used.

CHAC Acquisition Phase

In the example presented here above, this phase has a duration of 40 μs.

This phase has the function notably of performing:

a "calibration" to determine the transit time between a user station and the central station (a phase during which the position of a user relative to the master station is determined)

the estimation of the parameters of the channel used for the equalization between the user station concerned and the central station.

The central station (master station) sends a known sequence to the addressee or recipient designated in the RCH phase in order to send it data in the following frames, or again in the FCH phase to update the "calibration" for example in the case of a major change in the pulse response of the channel for reasons of mobility of the user station. The addressee user station is synchronized with the received pulses and returns them immediately or with a known and constant delay time to the master station. This means that the time between the transmission and the reception of the response is equal to the outgoing path time+the known and constant transit time in the addressee user station+the return path time (equal in principle to the outgoing path time).

This measurement of distance between a user station and the central station is performed for example by the latter upon reception of the sequence returned by the terminal concerned and is done by a method known to those skilled in the art.

Even if there is no user station to be "calibrated", the central station may send the sequence to sustain the synchronization.

The sequence transmitted by the master station is formed, for example, by 64 pulses spaced out by 250 ns, that is 16 μs, to which we must add the return time (4 μs) and the maximum round-trip time (12 μs): 32 μs to obtain the length of the sequence.

The number of pulses gives a gain that is high enough for the most distant stations to be capable of detecting the signal and getting properly synchronized. This gain may go up to about 18 dB, with only one sequence of a length of 64 is used, and it will be lower if a shorter sequence is repeated several times. This choice is a compromise between ease of detection and range. It depends on the performance of the receivers relating to synchronization: a receiver having a large number of correlators working in parallel can get synchronized directly on a sequence while another less efficient receiver will need several repetitions of the sequence to arrive at the same result. This number 64 leaves the field open to several possible configurations: a single sequence with a length of 64 (a gain of 18 dB), a sub-sequence with a length of 16 repeated four times (with a gain of 12 dB), etc.

In the case of a multiple repetition of a sub-sequence, the frame has an end-of-sequence indicator so that the receiver can identify its position. This can be done by inverting the polarity of the last sub-sequence.

Guard Time

Tg: 8 $\mu$s

The value of the guard time was chosen so as to compensate for the maximum lead time that the user station must apply to its transmissions towards the central station. For example, transmission can be started "earlier" than planned. Normally, each station would have to wait 8 $\mu$s after the end of the previous phase before transmitting, but since the stations are not all at the same distance from the central station, they must each compensate for the delay introduced by the propagation by advancing their transmission by a value proportional to their distance; this time lead or advance is based on the measurement of propagation time made in the CHAC phase. According to the example given, this guard time corresponds to 5 $\mu$s according to the assumptions made earlier on the maximum distance of the station.

Uplink Channel Transmission Phase

Duration: 768 $\mu$s (24*32 $\mu$s)

The example given corresponds to two alternative embodiments:

Solution with Interlacing of Users

The synchronization of the user stations is obtained just after the CHAC calibration phase. The user station uses the interrogation sequence sent by the central station for the "calibration" step as a time reference for the uplink transmissions. The terminals transmit the pulses with an advance communicated to them by the central station during the resource allocation stage FCH.

The interlacing is done, for example, on 10 users, with the assignment of a certain number of 32 $\mu$s slots to each user (with one pulse every 100 ns per user), one slot represents 40 bits in the case of 8 pulses per symbol, one slot represents 320 bits without interrogation, i.e. one symbol (hence one bit because a binary modulation has been assumed) is represented by only one pulse.

This procedure has the advantage of providing for discretion of transmission. Sending is easier for each mobile and the pulses are indeed spaced out at 100 ns instead of 10 ns.

Solution with TDMA without interlacing

In this alternative embodiment, the pulses are transmitted from a terminal to the central station without interlacing, i.e. every 10 ns (namely the maximum).

Random Access Phase RCH

RCH: duration 4 blocks of 64 $\mu$s (256 $\mu$s)

In this RCH phase, the user stations that wish to communicate with the central station send a message comprising the following characteristics:

a recurrence between the pulses (ex. 250 ns) (the time between successive pulses from a same transmitter), an integration value Ni (the number of pulses to be integrated to find a symbol), a number N of bits to be transmitted: if action groups are concerned, the number of terminals is limited, a 12 $\mu$s header enabling the central station to get synchronized with the new terminal.

These parameters are identical or substantially identical for all the user stations and are known to the central station.

Thus, the request message with Ni=16, N=12 and a recurrence of 250 ns, comprises 192 pulses and lasts 48 $\mu$s. It is preceded by a guard time of 4 $\mu$s and then a synchronization header of 12 $\mu$s, which corresponds to a 64 $\mu$s block.

The RCH phase comprises for example 4 blocks of 64 $\mu$s and each user station that wishes to communicate uses, for example a pseudo-random draw algorithm to select one of the four locations of blocks to transmit its message to it. If the transmission in this RCH phase is done without collision, the central station indicates the proper reception of the asker's identity in the next frame. When there is no response, the user station concerned repeats its request in the next frame.

Figure 7:
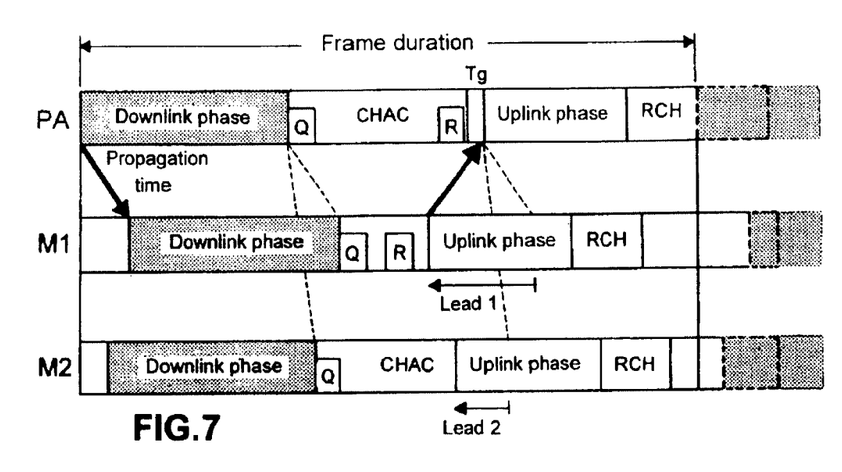
FIG. 7 exemplifies a simplified timing diagram with two user stations and the master station according to the frame presented according to the invention.

In order to explain the working of the system of the invention more clearly, FIG. 7 shows an example of the running of a simplified frame in a network consisting of the central station and two mobile stations M1 and M2 (users). M2 is the closest to the central station PA. The phase called the phase of time "calibration" and acquisition of the response of the channel (represented in FIG. 7 by the letters Q: question, R: response) is applied for the mobile M1 for example: For reasons of clarity, the header P1 is not shown and all the channels broadcast by the central station to the mobile stations are assembled under the term "downlink phase". Furthermore, the representation of the duration of the CHAC phase has been exaggerated, and its real phase is much shorter. Finally it is assumed that M1 and M2 have already gone at least once through the CHAC phase and that they both know the "time" lead to be applied to their transmission in the uplink phase.

The lead values t1, t2 respectively of the mobile stations M1, M2 are variable as a function of their distance from the central station. They are equal, for example, to twice the propagation time between the mobile station considered and the central station. This time t1, t2 is updated by the central station after the passage of the mobile station through the CHAC phase. It enables M1 and M2 to be accurately spaced out in time in the uplink phase so that their pulses are perfectly interlaced when they reach the central station.

The measurements of transit time are done for example with a precision of 1 ns, enabling pulses of various origins to be interlaced with sufficient precision every 10 ns.

Phase Called the Phase of Time "Calibration" and Measurement of Distance

Figure 8:
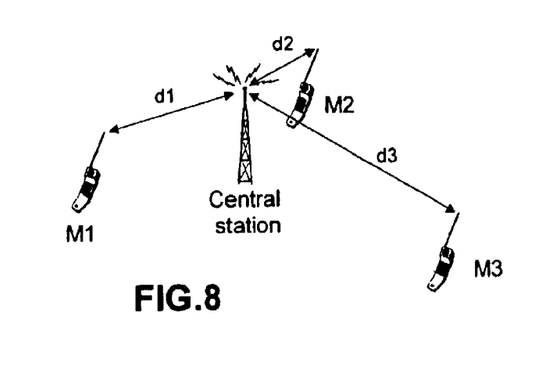
FIG. 8 exemplifies a principle of measurement of distance between the master station and the user stations.

FIG. 8 exemplifies a measurement known as that of time "calibration" between the central station and each of the mobile stations, from the measurement of distance coupled with the acquisition of the response of the channel.

During the "calibration" phase, the central station PA interrogates the two mobile stations M1, M2 and M3 in turn. This procedure has notably the following objectives:

For the Central Station:

To carry out a precise measurement of the distance at which the mobile station is located, based for example on the measurement of the propagation time of the signal, in order to give it an indication of a time lag or time lead to be applied in the uplink direction, To acquire the response of the transmission channel between the mobile station and the central station, based on the analysis of the response of the mobile concerned.

For the Mobile Station

To acquire or update the response of the transmission channel between the central station and itself, for example by periodic measurement in the CHAC phase.

Figure 9:
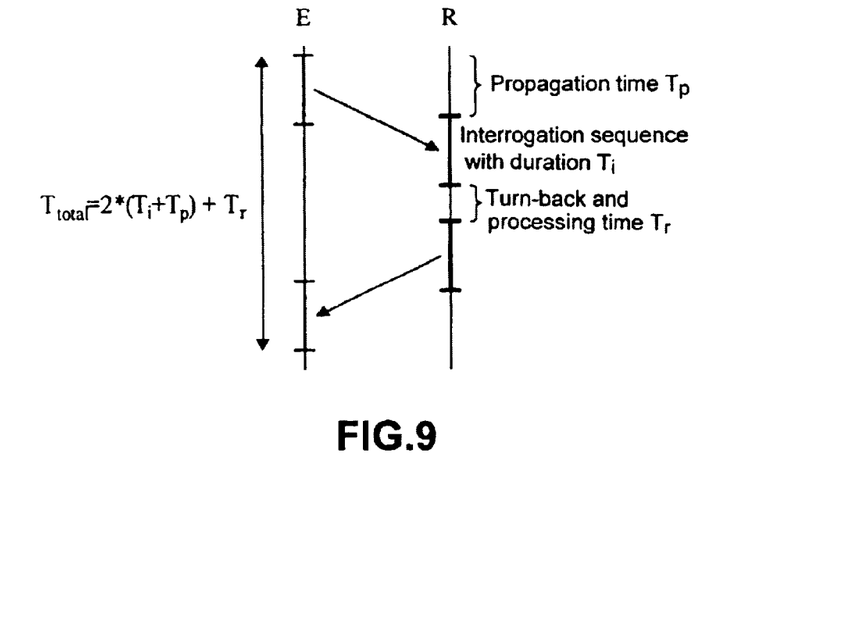
FIG. 9 shows the principle of a procedure known as the calibration procedure in the CHAC phase.

FIG. 9 gives a schematic view of the running of the procedure, where E represents the sender of the request (central station), and R is the receiver or interrogated mobile.

The sender E sends an interrogation sequence with a duration Ti, Tp represents the time of propagation of this request to the receiver R and Tr the request turn-back and processing time in the receiver. Thus, the time needed for the full processing of the round-trip procedure is equal to the round-trip propagation time plus the time of turn-back inside the mobile+the length of the sequences sent firstly by the central station and secondly by the mobile station, (the turn-back time corresponds to the time in the interrogated station between the reception of the signal and the re-sending of the response signal, which is classic in all transponder type devices).

Figure 10:
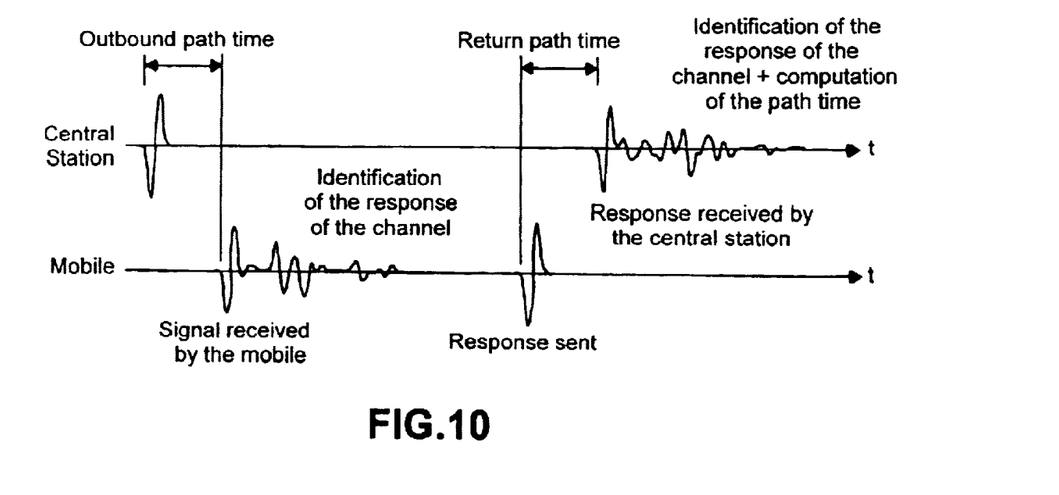
FIG. 10 exemplifies a principle of measurement of distance coupled with the identification of the channel.

FIG. 10 shows a timing diagram of the characteristic elements following the transmission of a piece of information of a pulse. This FIG. 10 has the following corresponding terms relative to the annotations of FIG. 9:

outgoing path time=time of propagation of the request, identification of the response of the channel=corresponds to the processing time, return path time=time of propagation of the return of the response to the interrogator, response received by the access point=time of arrival of the response.

This procedure is carried out pulse by pulse or pulse series by pulse series. The access point sends its pulse series, the mobile waits for the full series and then sends its own series in return.

Equalization Phase

The method according to the invention comprises a phase of equalization of the signals received by the receiver of the central station and user terminals comprising for example of the following two phases:
1) a phase of estimation of the parameters of the channel,
2) a phase of demodulation/demodulation using the parameters estimated in the phase 1.

The equalization of the uplink and that of the downlink are different.

The following example is given for a two-state amplitude modulation.

Figure 11:
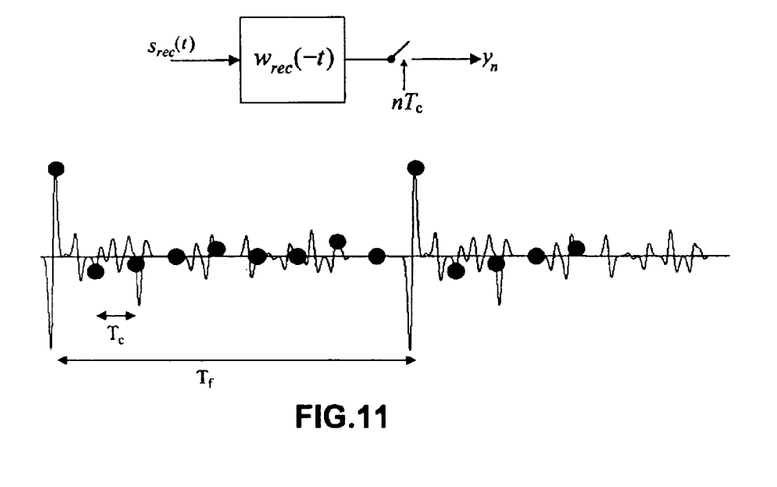
FIG. 11 exemplifies a principle of filtering and sampling at the input of the receiver.

FIG. 11 gives a schematic view of the principle of the filtering and sampling at the input of the receiver. The structure of the receiver used to carry out the equalization of the uplink and downlink propagation channel comprises for example a filter adapted to the received wave wrec(t) followed by a sampler at the "chip" rate Tc, i.e. that the rate of the interlaced pulses.

Estimation of the Parameters of the Channel

The parameters of the channel are estimated in a learning context in which a sequence of symbols known to the receivers is sent. A (central or user) station sends the known sequence of N symbols $s_{ref}=[s_{ref}(1), \ldots, s_{ref}(N)]^T$ and the signal received by the destination station (user or master respectively) after sampling is expressed as:

$$y=HCs_{ref}$$

with $y=[y(1), \ldots, y(M)]^T$ where C is the encoding matrix of the time spread code (used at the level of the time spread code used for the different users) and H is the (unknown) matrix formed by values of the pulse response h(t) of the channel, sampled at the rate $T_c$ (the response h(t) actually comprises the convolution of the emission filter, the reception filter and the propagation channel). It is known that, given the structure of the matrix H, it is possible to rewrite y in the form y=Sh where S is a matrix whose elements are known and $h=[h(1), \ldots, h(L)]^T$ with $h(n)=h(t)|_{t=nT_c}$. It is then possible to estimate h knowing S and y, for example by using a least error squares criterion whose classic solution is $\hat{h}=S^T(S^TS)^{-1}y$.

Equalization of the Downlink Channel

In the downlink channel, the signal received by the user u after sampling coming from the central station has the form:

$$y_{u,PA}=H_{u,PA}s$$

with $$s = \sum_{p=1}^{N_u} C_p s_p$$

where $H_{u,PA}$ is the matrix of convolution of the propagation channel between the central station and the user u, $C_p$ and $s_p$ are respectively the encoding matrix of the spread code and the sequence of symbols of the user p. Since the samples of the pulse response of the channel have been estimated, the equalization consists in canceling all or part of the effect of the channel in order to retrieve the symbols transmitted. A large number of equalizers existing in the literature are applicable, whether linear (EQMM, Zero Forcing (ZF), Rake, adapted filter, etc.) or non-linear (Viterbi, DFE, etc). For example, in the case of a linear equalizer using a ZF criterion, the matrix of the equalizer is written as follows: $G_{ZF}=(H_{u,PA}{}^T H_{u,PA})^{-1}H_{u,PA}{}^T$ and the output of the equalizer is equal to:

$$G_{ZF}y_{u,PA} = \sum_{p=1}^{N_u} C_p s_p.$$

Given the orthogonality of the spread codes, (due to the temporal interlacing of the users), the decoded symbols corresponding to the user u are obtained by selecting the corresponding outputs, or equivalently by applying the matrix $C_u$ to the output of the equalizer:

$$\hat{s}_u=C_u{}^T G_{ZF} y_{u,PA}.$$

Equalization of the Uplink Channel

The uplink channel is distinguished from the downlink channel by the fact that the central station sees the different users through different channels. The signal received by the central station coming from the user u is written as follows:

$$y_{PA,u}=H_{PA,u}C_u s_u$$

The composite signal received at the central station and coming from all the users is then written as:

$$y_{PA} = \sum_{p=1}^{N_u} H_{PA,p} C_p s_p$$

The estimation of the channels of the uplink channels (CHAC phase) enables the construction of the matrices $H_{PA,u}$. The received signal can be re-written in the form:

$$y_{PA}=H_{PA}s$$

with $H_{PA}=[H_{PA,1}C_1, \ldots, H_{PA,N_p}C_{N_p}]$ and $s=[S_1{}^T, \ldots, S_{N_p}{}^T]^T$. We are then brought back to the same problem as in the case of the downlink channel for which it is possible to apply the range of equalizers available in the literature referred to here above.

Tracking the Progress of the Parameters of the Transmission Channel

The tracking is done, for example, periodically in the CHAC following the designation of the concerned terminals by the access point (the master station) in the FCH. It is necessary to take account of the users movement or compensate for variations in his environment (movements by other persons, automobiles, etc)

Complementary Modes of Operation

Bit Rate Optimization Mode

For reasons of bit rate buildup, the central station may be led to authorize only mobile stations having a particularly short pulse response in the transmission channel between the stations and itself. The time difference between the pulses sent by a mobile station may therefore be reduced, thus avoiding any processing of equalization by the central station. This mode is useful when the number of mobile stations attached to the central station is great and the associated pulse response is particularly complicated.

Mode of Optimization of the Bit Rate by Limitation of Distance

The central station may prohibit access to a user station because:

the distance is too great and therefore liable to bring excessively great pulse responses;

the detection pulse response is too great and may slow down access at high bit rates.

The central station may therefore be led to indicate the length of integration to be used, namely the number of pulses a symbol (as a function of the link balance and hence the distance). It is therefore possible to interlink different users are different integration parameters (different bit rates, different priorities etc).

Optimization of the Spectrum Sent

The spectrum sent by the base, on the assumption of pulses transmitted regularly with a recurrence T, consists of lines spaced out by 1/T with an envelope in the shape of a sine x/x function. Under the same conditions of recurrence, the spectrum is identical for all the stations.

It is therefore possible, in this way, to avoid the certain frequency bands that are far too critical or far too vulnerable, by using an appropriate value of T. Thus if it is sought to avoid the GPS frequency bands ranging from 1,227.6 to 1,575.42 MHz, T may be computed in such a way that:

firstly, the lines in k/T avoid these frequencies;

secondly, the frequency interval in 1/T is greater than the bands to be avoided.

For example, with T=10 ns, 1/T=100 MHz and the closest lines are centered on 1.2, 1.3 GHz and 1.5, 1.6 GHz.

The invention can be applied notably whatever the choice of the modulation for the pulses (PPM, bipolar, etc) and independently of the use or non-use of any integration factor. It is also possible to superimpose a common code for each user of the central point if it is desired to separate two adjacent networks, as in a cell type structure.

What is claimed is:

1. A method of communications in a network using a protocol of pulse transmissions between one master station and one or more user stations, wherein the method comprises the following steps:

synchronizing pulse response of the master station received by the user stations;

acquiring the pulse responses from the user stations received by the master station;

sending pulses close to each other from the master station to the different user stations, and from the different users to the master station; and equalizing the pulses at reception for each user station and for the master station;

the equalization step comprising a step of estimation of the parameters of the propagation channel and a step of equalization with sampling at the chip rate, the rate of the associated pulses, the estimation of the parameters of the propagation channel comprising the following steps:

a station sends a known sequence of N symbols $s_{ref}=[s_{ref}(1), \ldots, s_{ref}(N)]^T$ and the signal received by a second station after sampling is expressed as a product of C the encoding matrix of the temporal spread code used by the different users and H the matrix formed by the values of the pulse response h(t) of the channel, sampled at the rate $T_c$ y is rewritten in the form y=Sh where S is a matrix whose elements are known and $h=[h(1), \ldots, h(L)]^T$ with $h(n)=h(t)|_{t=nT_c}$ h is estimated with S and y being known, in using a method of equalization.

2. The method according to claim 1, comprising the step of interlacing of signals sent from the user stations to the master station.

3. The method according to claim 1, comprising the step of interlacing of the signals sent from the master station to the user stations.

4. The method according to claim 1, wherein the synchronization step comprises a step for measuring the distance between the central station and a user making it possible to determine the time lag to be applied during transmission from a user station to the master station.

5. The method according to claim 1, wherein the equalization of the downlink channel uses a signal received by the user station and coming from the master station, the signal being expressed in the form:

$$y_{u,PA}=H_{u,PA}s$$

with $$s = \sum_{p=1}^{N_u} C_p s_p$$

where $H_{u,PA}$ is the matrix of convolution of the propagation channel between the master station and the user u, $C_p$ and $s_p$ are respectively the encoding matrix of the spread code and the sequence of symbols of the user p.

6. The method according to claim 1, wherein the step of equalization of the uplink channel uses a signal received by the master station and coming from a user, the signal having the form:

$$y_{PA,u}=H_{PA,u}C_u s_u$$

the composite signal received at the master station and coming from all the users is then written as:

$$y_{PA} = \sum_{p=1}^{N_u} H_{PA,p} C_p s_p$$

the matrices $H_{PA,u}$ are determined by means of the estimation of the channels of the uplink channels, the received signal is rewritten in the form $$y_{PA}=H_{PA}s$$

with $H_{PA}=[H_{PA,1}C_1, \ldots, H_{PA,N_p}C_p]$, and $s=[s_1^T, \ldots, s_{N_p}^T]^T$.

7. The method according to claim 1 wherein, during a downlink channel communication, at least the first pulse train is reserved to keep the synchronization with the master station.

8. The method according to claim 1 wherein the interlacing step uses an orthogonal code.

9. A system of communications in a network using a protocol of transmission by pulses between one master station and one or more user stations, wherein the master station and the user stations are equipped with processors adapted to:

synchronizing the pulse response from the master station received by the user stations;

acquiring the pulse responses from the user stations received by the master station;

sending pulses close to each other from the master station to the different user stations, and from the different users to the master station; and equalizing the pulses at reception for each user station and for the master station, the processors being adapted to estimate the parameters of the propagation channel and a step of equalization with sampling at the chip rate, the rate of the associated pulses the processors being adapted to estimate the parameters of the propagation channel comprising the following steps:

a station sends a known sequence of N symbols $s_{ref}=[s_{ref}(1), \ldots, s_{ref}(N)]^T$ and the signal y received by a second station after sampling is expressed as:

a product of C the encoding matrix of the temporal spread code used by the different users and H the matrix formed by the values of the pulse response h(t) of the channel, sampled at the rate $T_c$ y is rewritten in the form y=Sh where S is a matrix whose elements are known and $h=[h(1), \ldots, h(L)]_T$ with $h(n)=h(t)|_{t=nT_c}$ h is estimated with S and y being known, in using a method of equalization.

10. The use of the method according to claim 1 in a centralized network.

11. The use of the method according to claims 1 in a network carrying a UWB transmission layer.

12. The use of the method according to claim 9, wherein the processors are adapted to interlace signals sent from the user stations to the master station.

13. The use of the method according to claim 9, wherein the processors are adapted to interlace signals sent from the master station to the user stations.

14. The use of the method according to claim 9, according to wherein the processors are adapted to measure the distance between the central station and a user making it possible to determine the time lag to be applied during transmission from a user station to the master station.

15. The use of the method of claim 9, wherein the processors are adapted to estimate the equalization of the downlink channel uses of a signal received by the user station and coming from the master station, the signal being expressed in the form:

$$y_{u,PA}=H_{u,PA}s$$

with $$s = \sum_{p=1}^{N_u} C_p s_p$$

where $H_{u,PA}$ is the matrix of convolution of the propagation channel between the master station and the user u, $C_p$ and $s_p$ are respectively the encoding matrix of the spread code and the sequence of symbols of the user p.

* * * * *